(12) United States Patent
Sikora et al.

(10) Patent No.: US 7,184,521 B2
(45) Date of Patent: Feb. 27, 2007

(54) METHOD AND SYSTEM FOR IDENTIFYING A PARTY ANSWERING A TELEPHONE CALL BASED ON SIMULTANEOUS ACTIVITY

(75) Inventors: Scott Edward Sikora, Seattle, WA (US); Michael Jason Bishara, Westminster, CO (US); Rudolfo Xavier Munguia, Loveland, CO (US); William John Selig, Denver, CO (US)

(73) Assignee: Par3 Communications, Inc., Seattle, WA (US)

( * ) Notice: Subject to any disclaimer, the term of this patent is extended or adjusted under 35 U.S.C. 154(b) by 2 days.

(21) Appl. No.: 10/865,522

(22) Filed: Jun. 10, 2004

(65) Prior Publication Data

US 2005/0276390 A1 Dec. 15, 2005

(51) Int. Cl.
*H04M 1/64* (2006.01)
*H04M 11/00* (2006.01)
*G10L 11/00* (2006.01)
(52) U.S. Cl. .................... 379/69; 379/88.16; 704/270
(58) Field of Classification Search .................. None
See application file for complete search history.

(56) References Cited

U.S. PATENT DOCUMENTS

| | | | |
|---|---|---|---|
| 4,941,168 A * | 7/1990 | Kelly, Jr. .................. 379/69 |
| 5,155,760 A * | 10/1992 | Johnson et al. .......... 379/88.01 |
| 5,371,787 A * | 12/1994 | Hamilton .................... 379/386 |
| 5,450,484 A | 9/1995 | Hamilton |
| 5,467,391 A | 11/1995 | Donaghue |
| 5,644,624 A * | 7/1997 | Caldwell ...................... 379/69 |
| 5,724,420 A * | 3/1998 | Torgrim ...................... 379/372 |
| 5,818,909 A | 10/1998 | Van Berkum |
| 5,828,731 A * | 10/1998 | Szlam et al. ............. 379/88.16 |
| 6,208,970 B1 * | 3/2001 | Ramanan .................... 704/270 |
| 6,233,319 B1 * | 5/2001 | Cox et al. ................ 379/88.22 |
| 6,324,262 B1 * | 11/2001 | Tuttle .......................... 379/69 |
| 6,480,825 B1 * | 11/2002 | Sharma et al. ............. 704/270 |

* cited by examiner

*Primary Examiner*—Fan Tsang
*Assistant Examiner*—Joseph T Phan
(74) *Attorney, Agent, or Firm*—Perkins Coie LLP (57) ABSTRACT

A method and system for identifying whether a communicating party is a person or an automated device is provided. The identification system determines whether a person or an automated device is currently providing audio of the communication. When the identification is to be determined, the identification system outputs an audio signal to the party. The identification system monitors the input audio signal from the party to determine whether a person or an automated device is providing the input audio. The identification system makes this determination based on whether there is simultaneous sound on the input audio signal and the output audio signal. The greater the amount of simultaneous sound, the greater the likelihood that the party is an automated device.

58 Claims, 10 Drawing Sheets

METHOD AND SYSTEM FOR IDENTIFYING A PARTY ANSWERING A TELEPHONE CALL BASED ON SIMULTANEOUS ACTIVITY

TECHNICAL FIELD

The described technology relates generally to determining whether a person or an answering machine answers a telephone call.

BACKGROUND

Many companies have a need to place telephone calls to their customers for various reasons. For example, airlines may need to notify passengers of changes in flight schedules, mortgage companies may need to notify customers of when payments are past due, and taxi companies may need to notify riders when a taxi will arrive later than expected. It can be very expensive, however, to have an agent of a company place a call, wait for the call to be answered, and then deliver the appropriate message. Many times a person does not answer the call; rather, an automated device such as an answering machine answers the call. In some situations, it may be acceptable to deliver a message to the answering party regardless of whether it is a person or an automated device. For example, when the telephone call relates to a delayed flight, it may be acceptable to deliver the message to either party. (Some automated devices simply provide a message or greeting and cannot record a message from the caller such as a message from a telephone company indicating that the called number is no longer in service.) In other situations, it may be desirable to deliver the message only to an answering machine or only to a person. For example, when the telephone call relates to a past due bill, it may be desirable to deliver the message only to the person and not to an answering machine. In general, it would be desirable to be able to detect whether a person or an automated device has answered a telephone call.

Companies can reduce the expense associated with placing such telephone calls by using automated dialer technology. Using such technology, telephone calls can be automatically placed by a call dialer and, when the dialer detects that a call has been answered, it can connect the telephone call to an agent who can deliver the message as appropriate. Various algorithms have been developed for call dialers that decide when and how many telephone calls to place. The goal of these algorithms is to reduce the cost per call and maintain a high level of customer satisfaction. These algorithms factor in the anticipated time to have a telephone call answered, the percentage of calls that will be answered by answering machines, the number of available agents, the average time for an agent to complete a call, and so on.

If a message should be delivered only to an answering machine or only to a person, then identifying the party (i.e., a person or an automated device) early in the telephone call can reduce the expense further. Various algorithms have been developed for analyzing the audio signal from the answering party to identify whether the party is a person or an automated device. For example, one algorithm monitors how long it takes for the answering party to start speaking on the assumption that a person generally starts speaking sooner than an answering machine. Another algorithm analyzes the pattern of silence and non-silence when a telephone call is answered to determine whether the pattern is similar to that of a typical automated greeting. Yet another algorithm applies speech-recognition technology to determine whether the words spoken when the telephone call is answered are typical of an automated greeting.

Unfortunately, these techniques for identifying the answering have met with limited success. In some instances, the algorithms have a high rate of misidentification. In other instances, it takes too long to identify the answering party. It would be desirable to have a technique that would accurately and rapidly identify the answering party as a person or an automated device.

DETAILED DESCRIPTION

A method and system for identifying whether a communicating party is a person or an automated device is provided. In one embodiment, the identification system determines whether a person (i.e., a live voice) or an automated device (e.g., a recorded voice) is currently providing audio of the communication (e.g., telephone call). When the identification is to be determined, the identification system outputs an audio signal to the party. The identification system monitors the input audio signal from the party to determine whether a person or an automated device is providing the input audio. The identification system makes this determination based on whether there is simultaneous sound (e.g., human audible sound) on the input audio signal and the output audio signal. The greater the amount of simultaneous sound, the greater the likelihood that the party is an automated device. When a person is communicating and the other party to the communication is speaking, the person generally refrains from speaking until the other party stops. An automated device, however, generally keeps on transmitting the message irrespective of whether the other party is speaking or not. In other words, automated devices tend to "talk over" the other party. Thus, by analyzing the amount of "talk over" or "simultaneous activity" the identification system can rapidly and accurately identify the party as a person or an automated device.

In one embodiment, the identification system is used to identify whether the party that answers a telephone call is a person or an automated device, such as an answering machine. When the telephone call is answered, the identification system that placed the telephone call sends a message to the party via the output line of the telephone line. The identification system then monitors the input line of the telephone line. The identification system accumulates the time during which speech (or other audio) is occurring on both the input and output lines. If the accumulated time exceeds a threshold, the identification system identifies the party as an answering machine, because it appears that the party is talking over the message being sent. If the accumulated time does not exceed the threshold, the identification system identifies the party as a person, because the party is not talking over the message being sent.

In one embodiment, the identification system establishes an identification interval during which it analyzes the amount of overlap in talking, also referred to as simultaneous activity, on the input and output lines. If the amount of overlap exceeds a threshold amount during that interval, then the identification system identifies the answering party as an automated device. Otherwise, the identification system identifies the answering party as a person. For example, if the identification interval is two seconds, then the threshold amount may be set to one second. As soon as the identification system detects one second of overlap, it identifies that an automated device has answered the telephone call. If at the end of the identification interval the threshold amount of overlap has not been reached, the identification system identifies that a person has answered the telephone call. In one embodiment, the identification system can identify that a person has answered before expiration of the identification interval when the amount of time left in the identification interval is not sufficient for the amount of overlap to exceed the threshold amount. For example, if the threshold amount is one second, the amount of time left in the identification interval is less than one second, and no overlap has been detected so far, then it would be impossible for the amount of overlap to exceed the threshold amount. In such a case, the identification system may identify that a person has answered at any time when there is less than one second left in the identification interval and does not have to wait until the end of the identification interval. This is referred to as "early identification of a person."

One skilled in the art will appreciate that various values can be parameterized for controlling the identification of the party to achieve various performance goals and based on characteristics of the telephone calls. For example, if telephone calls are being placed to businesses, then the threshold amount of accumulated time could be increased to reflect that a person who answers a business telephone often says a standard greeting and may disregard the calling party until the greeting is complete (i.e., tends to talk over the calling party). In contrast, if telephone calls are being placed to residences, then the threshold amount could be decreased to reflect a generally shorter greeting by someone in their home. Various data analysis techniques may be applied to statistics gathered from such telephone calls to further refine the threshold amount and the identification interval. For example, the identification interval may be shortened during periods when statistically a higher percentage of telephone calls are likely to be answered by people. Various audio signal parameters may also be adjusted such as parameters for controlling the filtering of the signals on the input and output lines to remove spikes, energy levels indicating when a party is speaking, and so on. These parameters can also be dynamically set, for example, based on the amount of noise on the telephone line, the amount of background noise (e.g., baby crying), and so on. In addition, the identification interval may not start immediately when the telephone call is answered, but may start when or sometime after sound is first detected.

In one embodiment, the identification system may use an adjusted amount of overlap, rather than a straightforward summation of the overlap intervals. During certain times of a telephone call, it might be expected that both persons and automated devices may have the same talk-over characteristics. For example, in the first second after a telephone call is answered both an automated device and a person (especially if the person is answering for a business) may output a standard greeting that may talk over any incoming voice. In such a case, the identification system may give less weight to overlap during the first second. In general, the identification system can generate a score indicating whether the party is a person or an automated device that factors in the talk-over characteristics and many other characteristics, such as time from detection of answer to detection of voice, whether a cell phone has answered, and so on.

In one embodiment, the identification system may be implemented primarily on a call progress activity unit that interacts with a voice response unit. The telephone line can be input to both the call progress activity unit and the voice response unit. When an answer is detected, the voice response unit may send a message to the answering party (e.g., "This is the Acme Airline. We have an important message about your reservation."). The call progress activity unit can monitor both the input and output lines to identify when sound is on each line. Based on the amount and timing of simultaneous sound on the input and output lines, the call progress activity unit can identify the answering party. Alternatively, the call progress activity unit can be provided with information describing the characteristics of the message to be sent to the answering party such as the intervals during which sound will be output. When such information is provided, the call progress activity unit can avoid the monitoring of the output line.

Because of the speed and accuracy of the identification system, various additional techniques can be improved, or even enabled. For example, when the identification system identifies the answering party as a person, a telephone call can automatically be placed to an agent. By the time the initial message is completed, the agent will likely have answered the telephone call and can communicate directly with the person. The telephone call to the person and the telephone call to the agent can then be connected using various technologies such as a Two-B Channel Transfer. In such a case, another telephone call can be immediately placed on the telephone line since the telephone line after the transfer is no longer involved in the telephone call between the party and the agent. By placing telephone calls to agents, the need for complex switching units can be reduced or avoided, agents can be located anywhere in the world, and so on.

Figure 1:
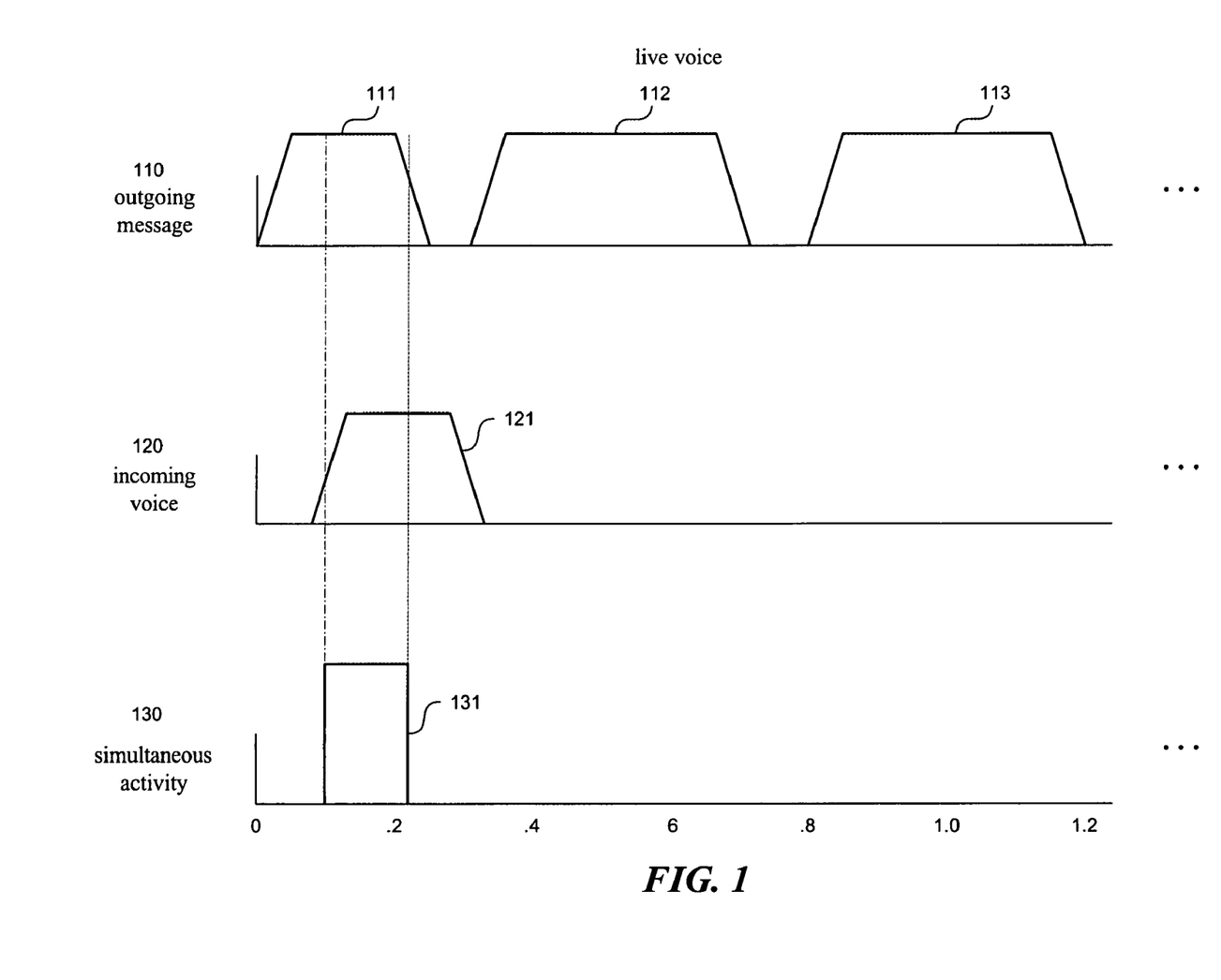
FIG. 1 provides timing diagrams illustrating characteristics of the simultaneous activity when a person answers a telephone call.

FIG. 1 provides timing diagrams illustrating characteristics of the simultaneous activity when a person answers a telephone call. Timing diagram 110 illustrates the characteristics of the outgoing message that is sent by the identification system. In this example, the outgoing message has sound intervals 111, 112, and 113. Sound interval 111 extends roughly from time 0 to time 0.2, sound interval 112 extends roughly from time 0.3 to time 0.7, and sound interval 113 extends roughly from time 0.8 to time 1.2. Timing diagram 120 illustrates the characteristics of the incoming live voice of a person. In this example, the live voice has sound interval 121 that extends roughly from time 0.1 to time 0.3. As is typical, a person answering a phone stops talking while an outgoing message is being output. Timing diagram 130 illustrates the period of simultaneous activity. In this example, the simultaneous activity is indicated by interval 131 that extends roughly from time 0.1 to time 0.2. As can be seen from the dashed lines, the simultaneous activity occurs during the interval in which the outgoing message and incoming voice are both active, that is, when sound is detected on the lines. The accumulated time of simultaneous activity is 0.1.

Figure 2:
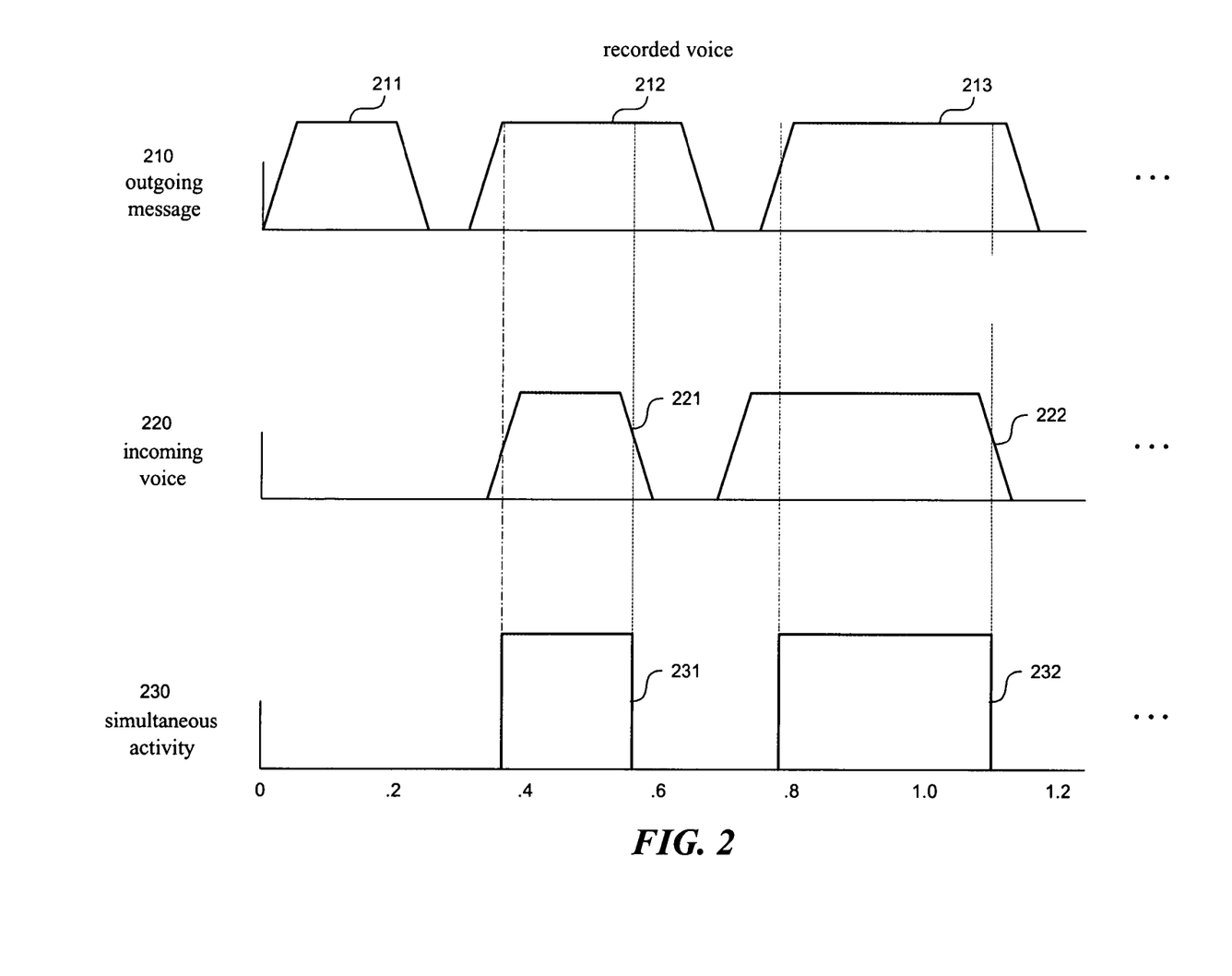
FIG. 2 provides timing diagrams illustrating characteristics of simultaneous activity when an automated device answers a telephone call.

FIG. 2 provides timing diagrams illustrating characteristics of simultaneous activity when an automated device answers a telephone call. Timing diagram 210 illustrates characteristics of the outgoing message sent by the identification system and is the same as diagram 110 in FIG. 1 and sound intervals 211, 212, 213 correspond to sound intervals 111, 112, 113. Timing diagram 220 illustrates characteristics of the incoming recorded voice of an automated device. In this example, the recorded voice has sound interval 221 that extends roughly from time 0.3 to time 0.6 and sound interval 222 that extends roughly from time 0.7 to time 1.1. Timing diagram 230 illustrates the intervals of simultaneous activity. In this example, the simultaneous activity is indicated by intervals 231 and 232. Interval 231 extends roughly from time 0.3 to time 0.6, and interval 232 extends roughly from time 0.8 to time 1.1. The accumulated time of simultaneous activity is 0.6.

Figure 3:
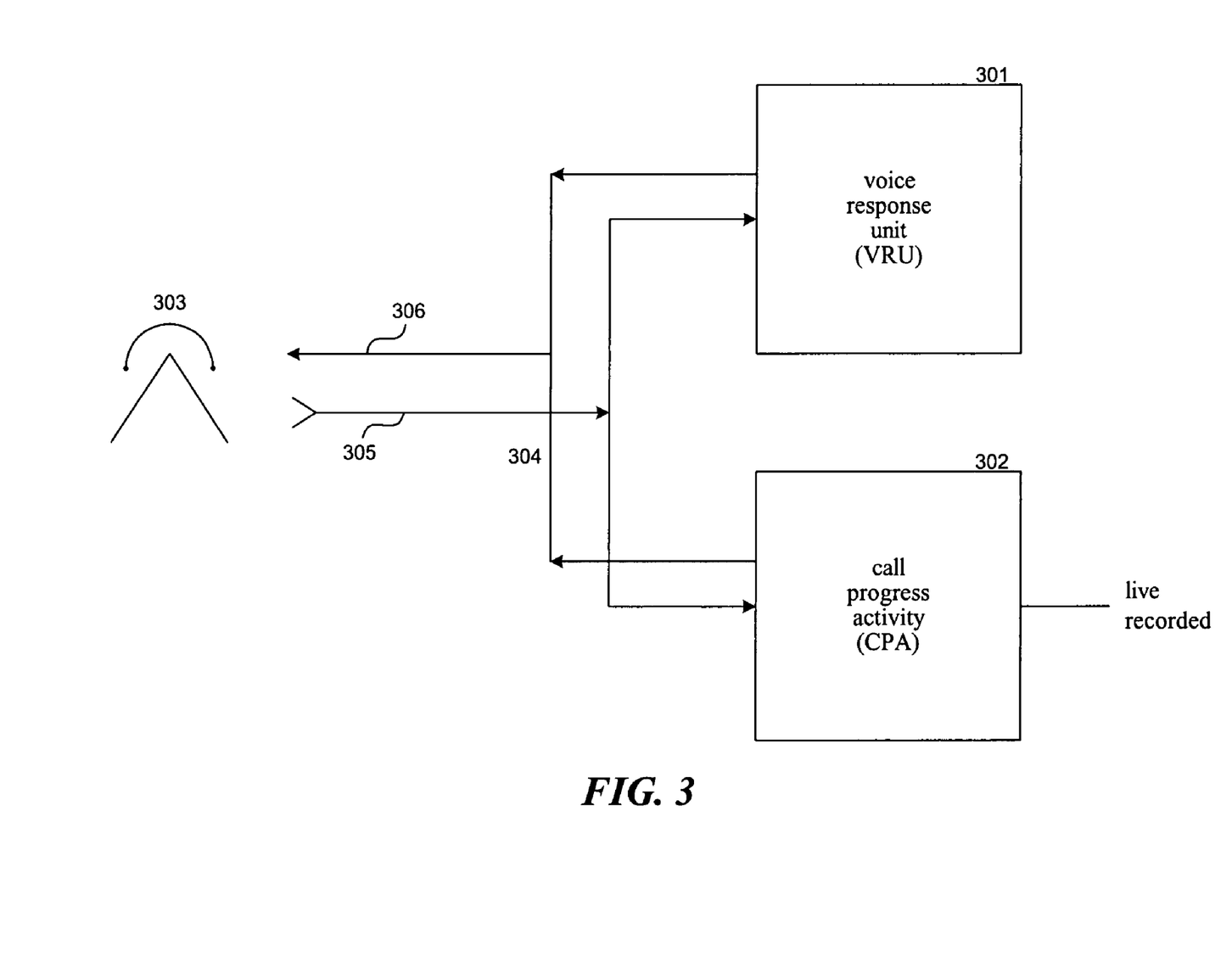
FIG. 3 is a block diagram illustrating components of the identification system in one embodiment.

FIG. 3 is a block diagram illustrating components of the identification system in one embodiment. In this embodiment, the identification system is implemented primarily in a call progress activity unit 302. The voice response unit 301 and the call progress activity unit 302 are connected to telephone 303 via telephone line 304. The telephone line comprises an input line 305 and an output line 306. (Input and output are from the point of view of the identification system.) In operation, when a telephone call is answered, the voice response unit starts sending a message on the output line 306. The call progress activity unit samples the input line and output line to determine when sound is being sent. The call progress activity unit then analyzes the intervals of simultaneous sound to determine whether the answering party is a person or automated device.

The computing device on which the identification system is implemented may include a central processing unit, memory, input devices (e.g., keyboard and pointing devices), output devices (e.g., display devices), and storage devices (e.g., disk drives). The memory and storage devices are computer-readable media that may contain instructions that implement the identification system. In addition, data structures and message structures may be stored or transmitted via a data transmission medium, such as a signal on a communications link. The identification system may be implemented in software or hardware (e.g., firmware or ASIC).

FIG. 3 illustrates an example of a suitable operating environment in which the identification system may be implemented. The operating environment is only one example of a suitable operating environment and is not intended to suggest any limitation as to the scope of use or functionality of the identification system.

The identification system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of program modules may be combined or distributed as desired in various embodiments. The logic of the identification system may be implemented in discrete logic or in any combination of hardware, firmware, and software.

Figure 4:
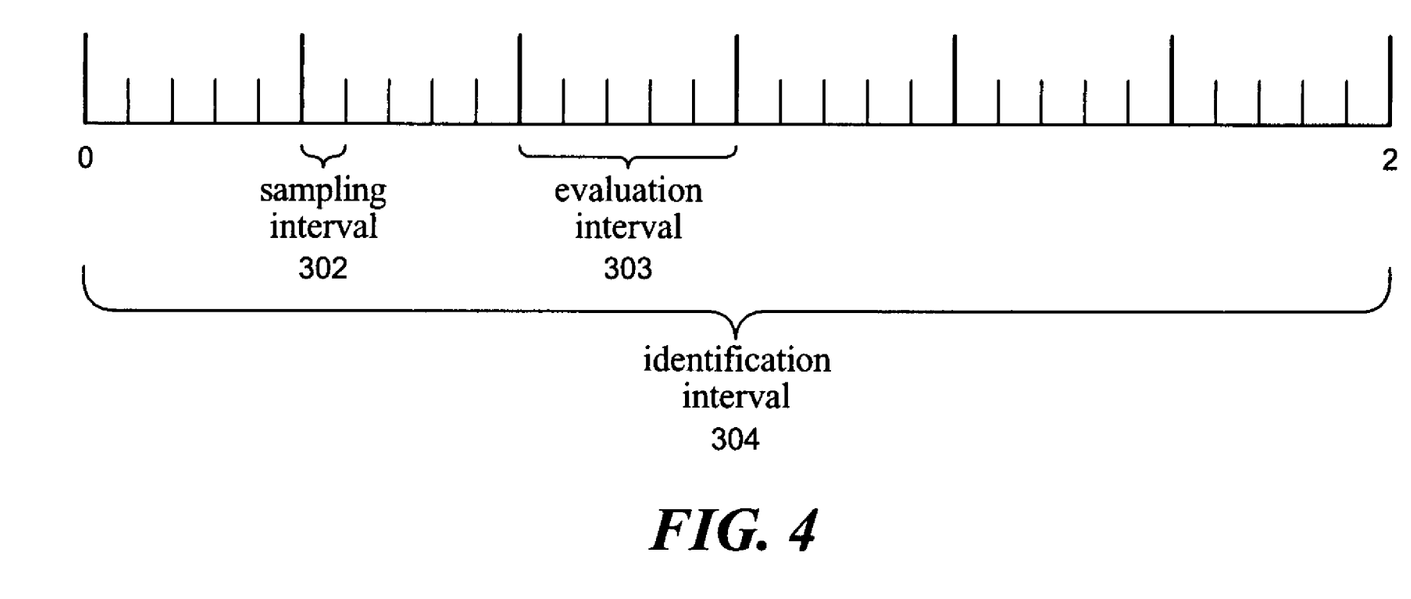
FIG. 4 is a diagram illustrating various intervals used by the identification system in one embodiment.

FIG. 4 is a diagram illustrating various intervals used by the identification system in one embodiment. The identification interval 304 represents the amount of time to be allotted to identifying the answering party. In this example, the identification interval is two seconds. One skilled in the art would appreciate that the identification interval can be a parameter that is adjusted to accommodate the various needs of the identification process. In addition, the identification interval can be variable in the sense that the identification process might be extended when the answering party has not been identified to an acceptable confidence level. The identification interval may be divided into evaluation intervals 303. An evaluation interval indicates the times at which the evaluation is made as to whether the answering party can be identified. An evaluation interval may be divided into sampling intervals 302. A sampling interval indicates the time interval between sampling of the telephone line. An analog-to-digital device may perform the sampling. At each sampling interval, the identification system may simply store the sample audio level for evaluation at the evaluation intervals. Alternatively, depending on the computation power of the identification system, an evaluation may be performed at each sampling interval. The sampling interval, evaluation interval, and identification interval may all be configurable parameters.

Figure 5:
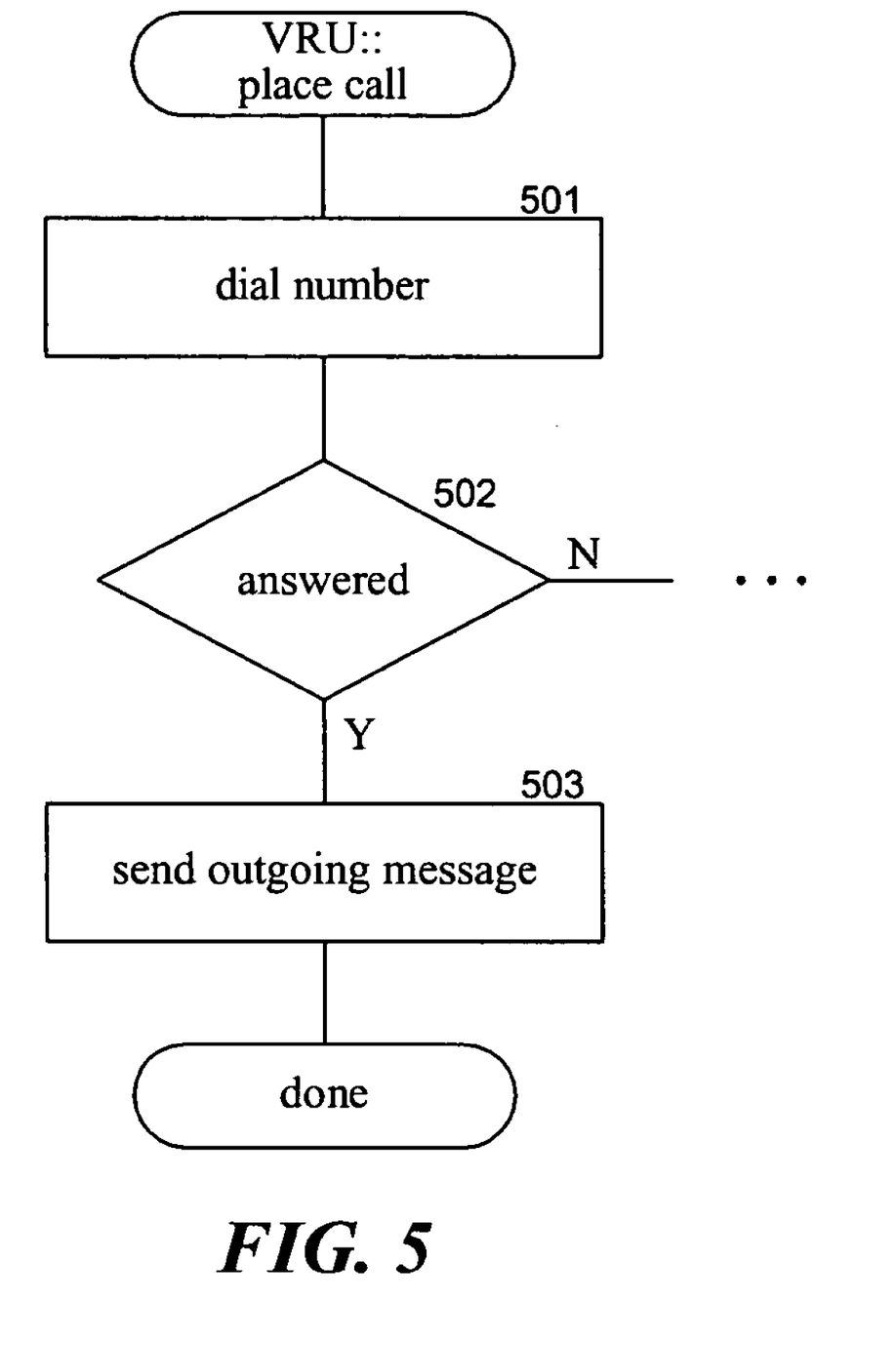
FIG. 5 is a flow diagram illustrating the placing of a telephone call by the voice response unit in one embodiment.

FIGS. 5–9 are flow diagrams illustrating the processing of the identification system in one embodiment. FIG. 5 is a flow diagram illustrating the placing of a telephone call by the voice response unit in one embodiment. In block 501, the voice response unit dials a telephone number, which may be performed by a call dialer. In decision block 502, if the telephone call has been answered, then the unit continues at block 503, else the unit continues with standard processing for an unanswered telephone call. In block 503, the unit sends the appropriate outgoing message on the telephone line and then completes.

Figure 6:
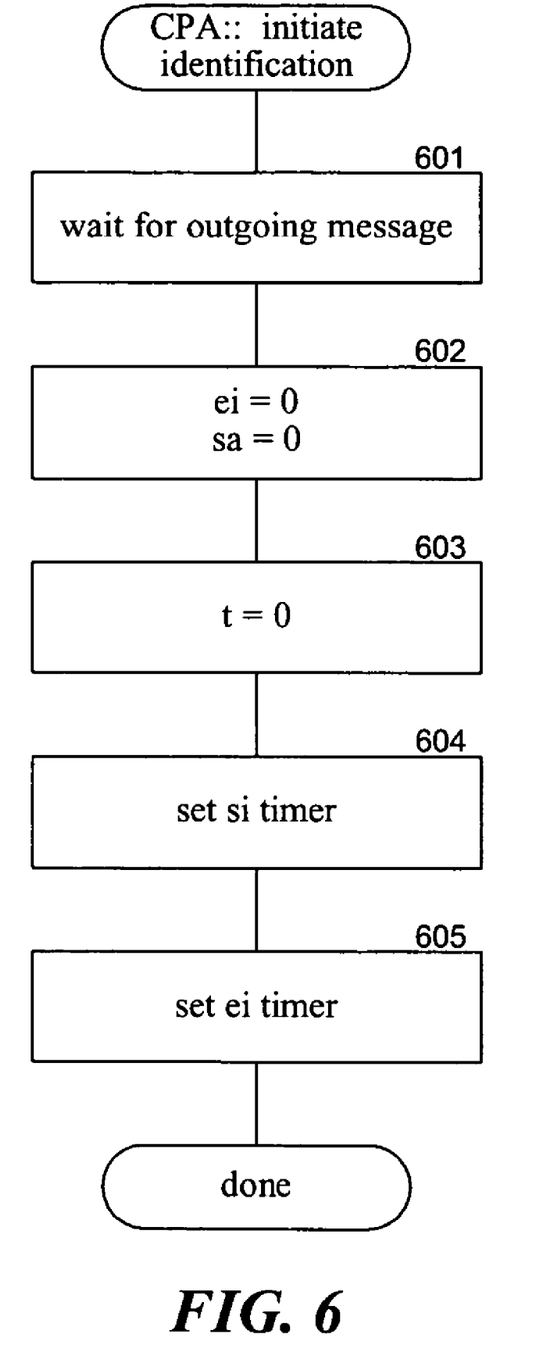
FIG. 6 is a flow diagram illustrating the processing of an initiate identification component of the call process activity unit in one embodiment.

FIG. 6 is a flow diagram illustrating the processing of an initiate identification component of the call process activity unit in one embodiment. This component waits for the detection of the outgoing message, initializes system variables, and sets timers for the sampling interval and the evaluation interval. In block 601, the component waits for the detection of the outgoing message. In block 602, the component initializes an evaluation interval index ("ei") and a simultaneous activity count ("sa"). The evaluation interval index tracks the current evaluation interval within the identification interval. The simultaneous activity count keeps track of the number of sampling intervals during which sound was detected on both the input and output lines. In block 603, the component initializes a sampling index ("t"). In block 604, the component sets a sampling interval timer. In block 605, the component sets an evaluation interval timer and then completes.

Figure 7:
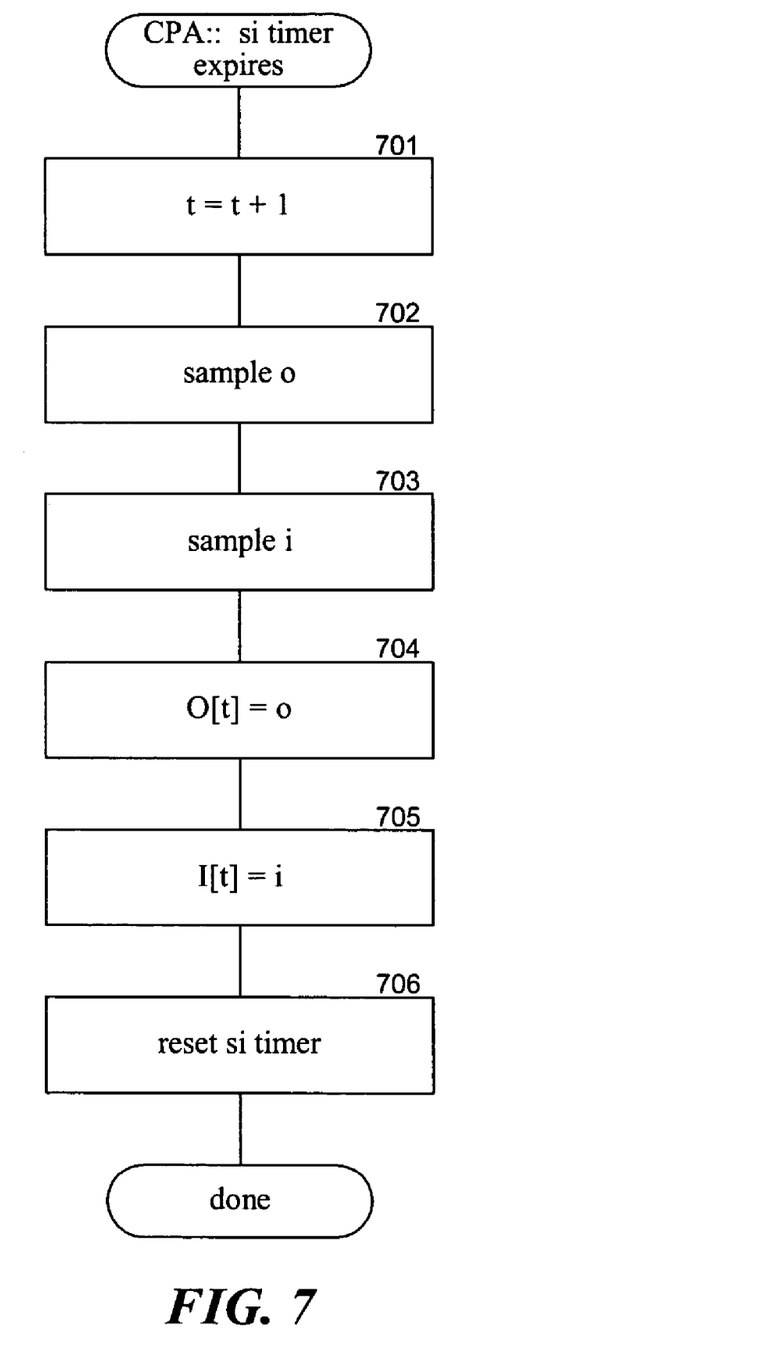
FIG. 7 is a flow diagram illustrating the processing of a sampling interval timer expiration component of the call progress activity unit in one embodiment.

FIG. 7 is a flow diagram illustrating the processing of a sampling interval timer expiration component of the call progress activity unit in one embodiment. This component is invoked whenever the sampling interval timer expires. The component samples the input and output lines, stores their values, and resets the sampling interval timer. In block 701, the component increments the sampling index. In block 702, the component samples the output line ("o"). In block 703, the component samples the input line ("i"). In block 704, the component stores the sampled output in an output array indexed by the sampling index ("O[t]"). In block 705, the component stores the sampled input in an input array indexed by the sampling index ("I[t]"). In block 706, the component resets the sampling interval timer and then completes.

Figure 8:
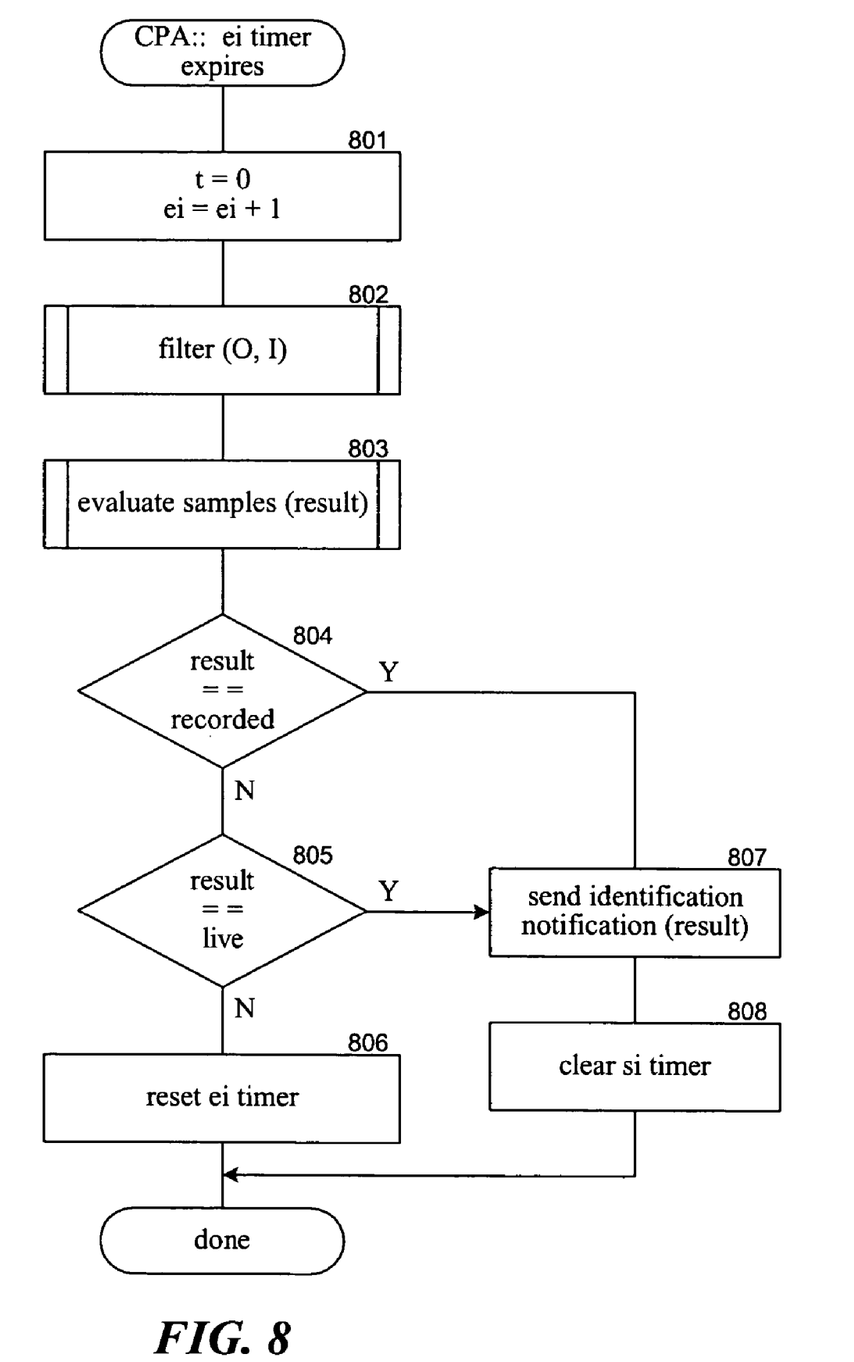
FIG. 8 is a flow diagram illustrating the processing of an evaluation interval timer expiration component of the call processing activity unit in one embodiment.

FIG. 8 is a flow diagram illustrating the processing of an evaluation interval timer expiration component of the call processing activity unit in one embodiment. This component is invoked when the evaluation interval timer expires. The component filters the sampled data of the input and output arrays and evaluates the simultaneous activity. The component sets an identification flag when the party has been identified. In block 801, the component resets the sampling index. The component also increments the evaluation interval index to indicate the current evaluation interval. In block 802, the component invokes a filtering component passing the output array and the input array. The filtering component returns an indication of the intervals of sound, which may be stored in the input and output arrays or in separate arrays. The filtering component may use various techniques to identify when sound is being sampled. These techniques may compare the sample of this evaluation interval to that of previous evaluation intervals. In block 803, the component invokes an evaluate samples component to determine whether the answering party can be identified. The invoked component returns an indication as to whether the answering party has been identified. In decision block 804, if the answering party has been identified as an automated device, then the component continues at block 807, else the component continues at block 805. In block 805, if the answering party has been identified as a person, then the component continues at block 807, else the component continues at block 806. In block 806, since the answering party has not been identified, the component resets the evaluation interval timer and then completes. In block 807, since the answering party has been identified, the component sends an identification notification message. In block 808, the component clears the sampling interval timer since no more samples are needed. The component then completes.

Figure 9:
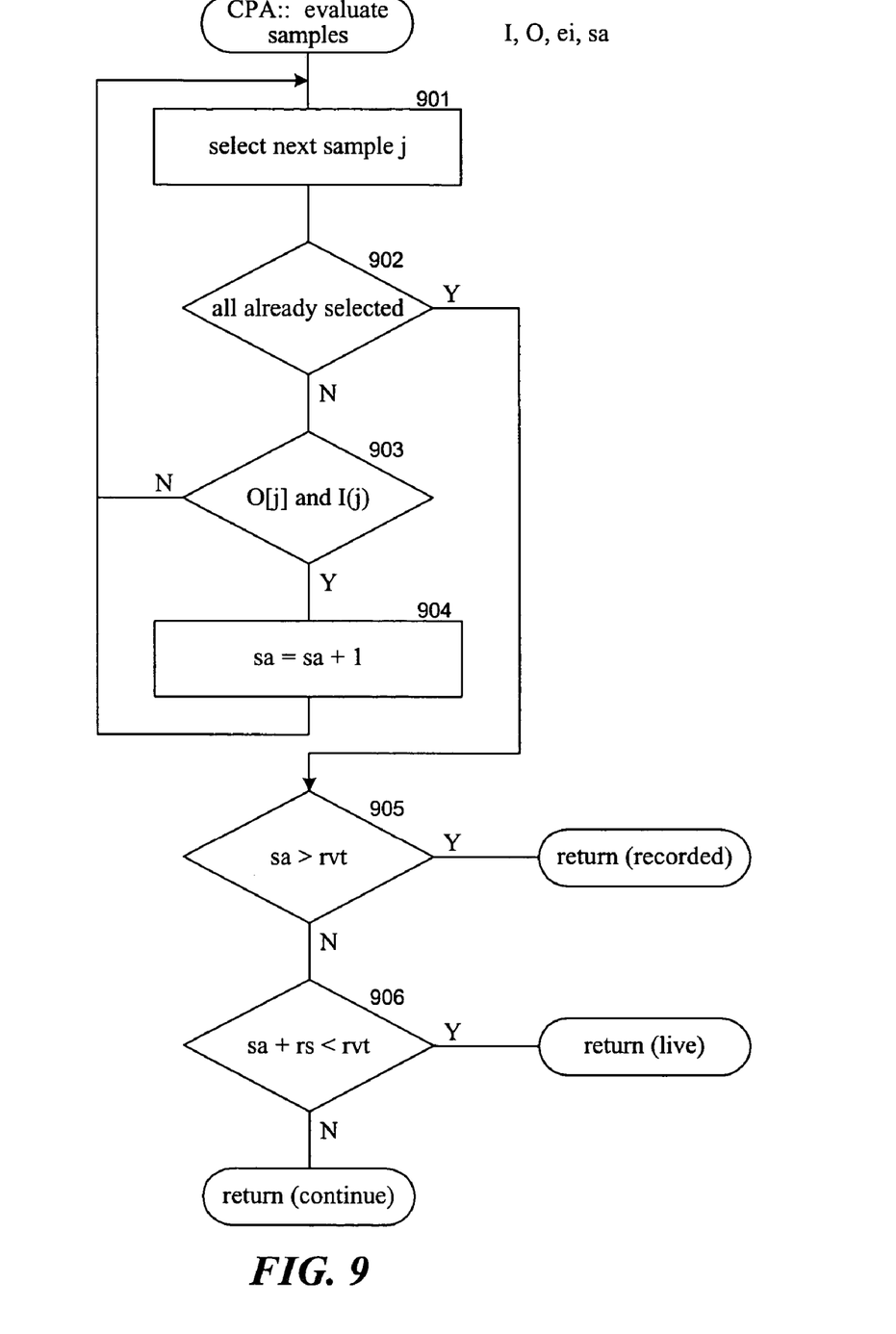
FIG. 9 is a flow diagram illustrating the processing of the evaluate samples component of the call processing activity unit in one embodiment.

FIG. 9 is a flow diagram illustrating the processing of the evaluate samples component of the call processing activity unit in one embodiment. This component is passed an indication of the sample input and output arrays, the evaluation interval index, and the simultaneous activity count. The component analyzes the input and output arrays to determine the amount of simultaneous activity that has occurred during the current evaluation interval. The component then determines whether the answering party can be identified. In blocks 901–904, the component loops processing each sample in the arrays. In block 901, the component selects the next sample ("j") of the arrays. In decision block 902, if all the samples have already been selected, then the component continues at block 905, else the component continues at block 903. In decision block 903, if the selected sample of the output array ("O[j]") and the selected sample of the input array ("I[j]") indicate that sound was on both the input and output lines during the sampling interval, then the component continues at block 904, else the component loops to block 901 to select the next sample. In block 904, the component increments the simultaneous activity count and then loops to block 901 to select the next sample. In decision block 905, if the simultaneous activity count is greater than the recorded voice threshold ("rvt"), then the component returns an indication that a recorded voice has been identified, else the component continues at block 906. In decision block 906, if the simultaneous activity count plus the remaining sampling intervals ("rs") of the identification interval are less than the recorded voice threshold, then there is not enough time left in the identification interval for a recorded voice determination to be made and the component returns an indication that a live voice has been identified, else the component returns an indication that an identification has not yet been made.

Figure 10:
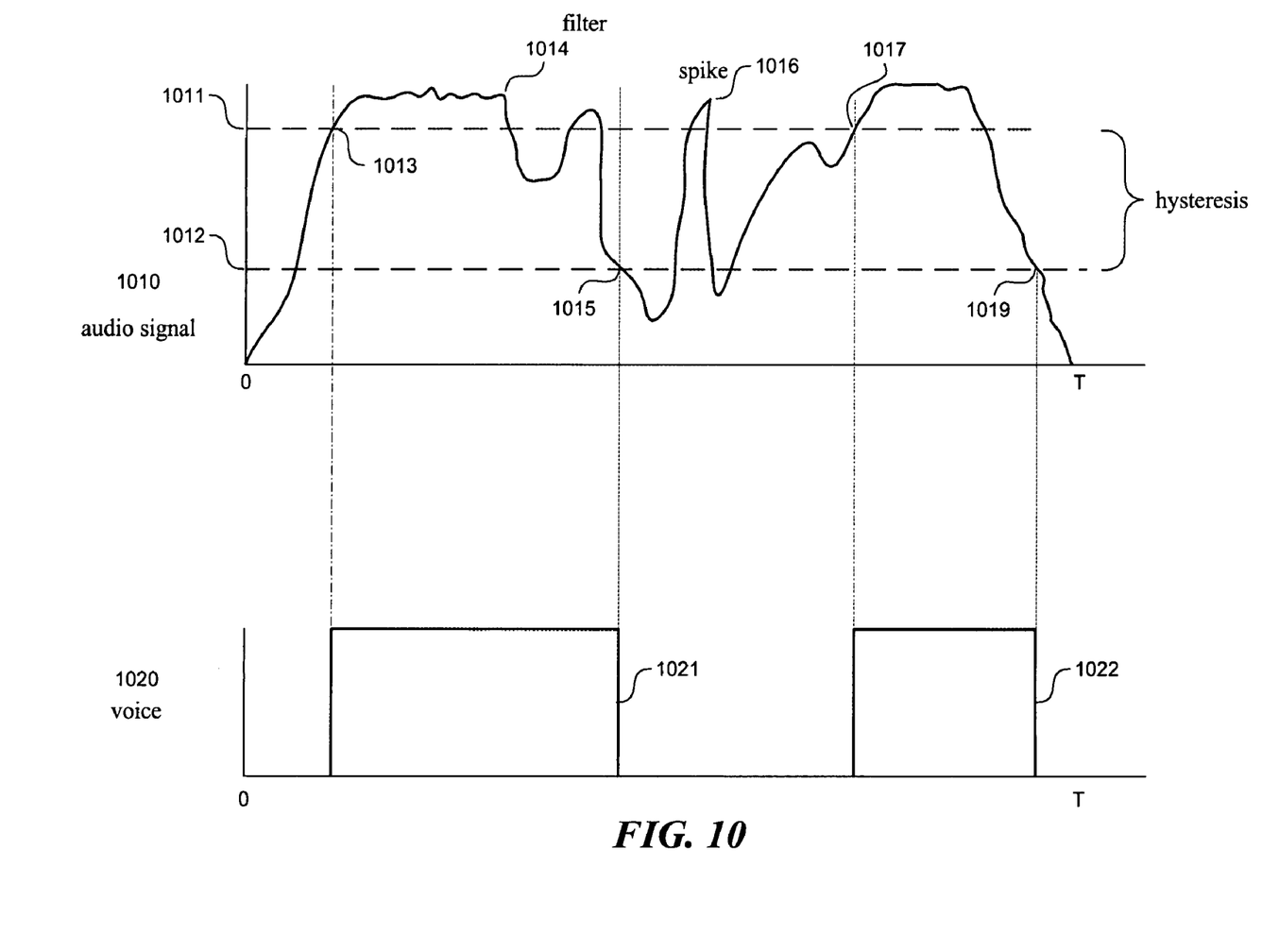
FIG. 10 is a diagram illustrating the detection of sound intervals in one embodiment.

FIG. 10 is a diagram illustrating the detection of sound intervals in one embodiment. Graph 1010 illustrates the audio level of an input line or an output line over time. The identification system uses a hysteresis effect when identifying sound intervals. In this example, the start of a sound interval is audio level 1011 and the end of a sound interval is audio level 1012. When an increasing audio level crosses the start of sound level and sound is not currently being detected, then a sound interval is started. When a decreasing audio level crosses the end of sound level and sound is currently being detected, then the current sound interval is ended. The difference between the start and end audio levels reflects the hysteresis effect. The audio signal crosses the start sound level at point 1013 and re-crosses the start sound level at point 1014. However, because of the hysteresis effect, point 1014 is not considered the end of the sound interval. Rather, the end of the sound interval is at point 1015 where the audio signal crosses the end of sound level. The identification system may also filter the audio signal to remove noise such as a spike 1016. Graph 1020 illustrates the sound intervals in this example. Sound interval 1021 extends from point 1013 to point 1015 and sound interval 1022 extends from point 1017 to point 1019.

One skilled in the art will appreciate that although specific embodiments of the identification system have been described herein for purposes of illustration, various modifications may be made without deviating from the spirit and scope of the invention. Speech recognition technologies can be used to recognize the audio input when the answering party has been identified as either a live or recorded voice. The recognized input can be analyzed to classify the message. For example, messages that indicate the called party has a new telephone may be classified together, messages that indicate the telephone number has been disconnected may be classified together, messages that indicate the names of people may be classified together, and so on. The company placing the telephone call can then take the appropriate action, such as removing the called party from a call list. The identification system may also track at what time during the telephone call the answering party ended the call. The time may be correlated to the output message to see whether the answering party ended the call because of what was said in the message. One skilled in the art will appreciate that the identification system can be used to differentiate between live and recorded voices for various reasons. For example, when a party receives a telephone call, the identification system may be used to identify whether the calling party is a person or an automated device. If the calling party is an automated device, then the call can be ended without ringing it through to a person if desired. One skilled in the art will appreciate that the identification system can be used in the analog domain as well as in the digital domain. In the analog domain, the identification system may use logic to set a "talk signal" high or low when the amplitude of the input audio signal exceeds a threshold indicating that sound is being transmitted. The identification system can monitor this talk signal to determine the intervals of sound on the input signal line. Accordingly, the invention is not limited except by the appended claims.

We claim:

1. A method for detecting whether an automated device is currently providing audio on a telephone call, the method comprising:
   establishing a telephone call between a calling party and a recipient;
   outputting a first audio signal from the calling party to the recipient of the telephone call;
   inputting a second audio signal from the recipient of the telephone call while outputting the first audio signal to the recipient, the second audio signal being different from the first audio signal;
   determining an amount of time during which the first audio signal and the second audio signal are both active by comparing the first audio signal and the second audio signal; and
   when the determined amount exceeds a threshold amount, indicating that an automated device is providing the second audio signal.

2. The method of claim 1 wherein when the determined amount does not exceed the threshold amount, indicating that a person is providing the second audio signal.

3. The method of claim 1 wherein the automated device provides a recorded voice as the second audio signal.

4. The method of claim 1 wherein the second audio signal is active when a human audible sound is being represented.

5. The method of claim 1 wherein the detecting occurs over an identification interval and the determining occurs at evaluation intervals within the identification interval.

6. The method of claim 5 wherein when the determined amount of time during which the second audio signal and the first audio signal are both active cannot exceed the threshold amount, indicating that an automated device is not providing the second audio signal.

7. The method of claim 5 wherein when the determined amount of time during which the second audio signal and the first audio signal are both active cannot exceed the threshold amount, indicating that a person is providing the second audio signal.

8. The method of claim 1 wherein the second audio signal is filtered to remove spikes.

9. The method of claim 1 wherein the determining applies a hysteresis effect to the second audio signal.

10. The method of claim 1 wherein the first audio signal is sampled to determine when the first audio signal is active.

11. The method of claim 1 including receiving an indication of when the first audio signal is active without having to sample the first audio signal.

12. The method of claim 1 including when it is indicated that an automated device is providing the second audio signal, performing recognition of the input second audio signal.

13. The method of claim 12 wherein the recognized input second audio signal is used to determine whether a telephone number has changed.

14. The method of claim 12 wherein the recognized input second audio signal is used to determine whether a party other than an intended party has provided the second audio signal of the automated device.

15. The method of claim 1 including when the telephone call is terminated by the called party, identifying the time of termination so that the time of termination can be correlated with what was currently being output on the first audio signal.

16. The method of claim 1 including using different thresholds for residential and business telephones.

17. An automated method for detecting whether a recorded voice or a live voice is currently providing audio of a telephone call, the method comprising:
    establishing a telephone call between a calling party and a recipient;
    outputting a first audio signal from the calling party to the recipient of the telephone call;
    inputting a second audio signal from the recipient of the telephone call while outputting the first audio signal to the recipient, the second audio signal being different from the first audio signal; and
    determining whether a recorded voice or a live voice is providing the second audio signal based on amount of overlap of sound on the first audio signal and the second audio signal.

18. The method of claim 17 wherein the amount of overlap represents times during which sound is simultaneously on the second audio signal and the first audio signal.

19. The method of claim 17 wherein when the amount of overlap exceeds a threshold amount, indicating that a recorded voice is providing the second audio signal.

20. The method of claim 17 wherein when the amount of overlap does not exceed the threshold amount, indicating that a live voice is providing the second audio signal.

21. The method of claim 17 wherein the overlap is weighted differently depending on timing of the overlap.

22. The method of claim 17 wherein the detecting occurs over an identification interval and the determining occurs at evaluation intervals within the identification interval.

23. The method of claim 22 wherein when the amount of overlap cannot exceed a threshold amount based on amount of overlap possible during the identification interval, indicating that a live voice is providing the second audio signal.

24. The method of claim 17 wherein the second audio signal is filtered to remove spikes.

25. The method of claim 17 wherein the determining applies a hysteresis effect to the second audio signal.

26. The method of claim 17 wherein the first audio signal is sampled to determine when the first audio signal represents sound.

27. The method of claim 17 including receiving an indication of when the first audio signal represents sound without having to sample the first audio signal.

28. The method of claim 17 including when it is detected that a recorded voice is providing the second audio signal, performing recognition of the second audio signal.

29. The method of claim 17, wherein the telephone call is a first telephone call, and the method further including:
    when it is determined that a live voice is providing the second audio signal,
    placing a second telephone call to an agent; and
    when that second telephone call is established, connecting the first and second telephone calls so that the agent can talk to a person providing the live voice.

30. The method of claim 29 wherein the connecting is via a Two-B Channel Transfer.

31. The method of claim 29 wherein the telephone calls are not connected through a device that placed the telephone calls.

32. The method of claim 17 including when the telephone call is terminated by a person providing the live voice, identifying the time of termination so that it can be correlated with what was currently being output on the output audio signal.

33. The method of claim 17 including using different overlap thresholds indicating whether the second audio signal is being provided by a live voice or a recorded voice for residential and business telephones.

34. The method of claim 17 wherein a live voice is detected as a result of a person who stops speaking upon hearing the first audio signal.

35. A system for identifying a party answering a telephone call, comprising:
   a telephone line having an input line and an output line;
   a first component that monitors the input line to detect when the telephone call has been answered and, when answered, outputs a first audio signal to the output line; and
   a second component that monitors the input line for a second audio signal different from the first audio signal while the first component is outputting the first audio signal to the output line to determine when the second and first audio signals are simultaneously being input on the input line and output on the output line, respectively, the amount of overlap indicating whether a person or an automated device has answered the telephone call.

36. The system of claim 35 wherein the first component is a voice response unit and the second component is a call progress activity unit.

37. The system of claim 35 wherein the telephone line is connected to both the first component and the second component.

38. The system of claim 35 wherein the second component monitors the output line to determine when the first audio signal is being output.

39. The system of claim 35 wherein when the determined amount of overlap exceeds a threshold, indicating that an automated device has answered the telephone call.

40. The system of claim 39 wherein when the determined amount of overlap does not exceed the threshold, indicating that a person has answered the telephone call.

41. The system of claim 39 wherein the amount of overlap contributes differently to exceeding the threshold depending on timing.

42. The system of claim 35 wherein the identifying occurs over an identification interval and the determining occurs at evaluation intervals within the identification interval.

43. The system of claim 42 wherein when the determined amount of overlap cannot exceed a threshold based on amount of overlap possible during the identification interval, indicating that a person has answered the telephone call.

44. The system of claim 35 wherein the telephone call is a first telephone call and when it is determined that a person has answered the first telephone call, the first component places a second telephone call and, when that second telephone call answers, connects the first and second telephone calls.

45. The system of claim 44 wherein the connection is via a Two-B Channel Transfer.

46. The system of claim 44 wherein the telephone calls are not connected through the telephone line.

47. A method for detecting whether an automated device is currently providing audio on a telephone call, the method comprising:
   dialing a telephone call from a calling party to a recipient;
   outputting a first audio signal to the recipient of the telephone call after the recipient answers the telephone call;
   inputting a second audio signal from the recipient of the telephone call, the second audio signal being different from the first audio signal;
   simultaneously sampling both the first audio signal and the second audio signal;
   determining an amount of time during which the first audio signal and the second audio signal are both active by comparing the first and second audio signals based on the sampling; and
   when the determined amount exceeds a threshold amount, indicating that an automated device is providing audio of the second audio signal.

48. The method of claim 47 wherein when the determined amount does not exceed the threshold amount, indicating that a person is providing the audio.

49. The method of claim 47 wherein the second audio signal is active when a human audible sound is being represented.

50. The method of claim 47 wherein when the determined amount of time during which the first audio signal and second audio signal are both active cannot exceed the threshold amount, indicating that an automated device is not providing the audio.

51. The method of claim 47 wherein the determining applies a hysteresis effect to the second audio signal.

52. The method of claim 47 including using different thresholds for residential and business telephones.

53. A method for detecting whether an automated device is currently providing audio on a telephone call, the method comprising:
   establishing a telephone call between a calling party and a recipient;
   outputting a first audio signal to the recipient of the telephone call after the telephone call is established;
   monitoring an input audio line for a second audio signal different from the first audio signal to determine an amount of time that the input audio line is active while outputting the first audio signal by comparing the first and second audio signals; and
   when the determined amount of time exceeds a threshold, indicating that a machine is providing audio of the second audio signal.

54. The method of claim 53 wherein when the determined amount does not exceed the threshold amount, indicating that a person is providing the audio.

55. The method of claim 53 wherein the second audio signal is active when a human audible sound is being represented.

56. The method of claim 53 wherein when the determined amount of time during which the first audio signal and second audio signal are both active cannot exceed the threshold amount, indicating that an automated device is not providing the audio.

57. The method of claim 53 wherein the monitoring applies a hysteresis effect to the second audio signal.

58. The method of claim 53 including using different thresholds for residential and business telephones.

* * * * *